(12) United States Patent
Sun et al.

(10) Patent No.: US 8,139,838 B2
(45) Date of Patent: Mar. 20, 2012

(54) SYSTEM AND METHOD FOR GENERATING MR MYOCARDIAL PERFUSION MAPS WITHOUT USER INTERACTION

(75) Inventors: Ying Sun, Singapore (SG); Jens Gühring, Monmouth Junction, NJ (US)

(73) Assignee: Siemens Aktiengesellschaft, Munich (DE)

( * ) Notice: Subject to any disclaimer, the term of this patent is extended or adjusted under 35 U.S.C. 154(b) by 437 days.

(21) Appl. No.: 12/431,888

(22) Filed: Apr. 29, 2009

(65) Prior Publication Data

US 2009/0290778 A1    Nov. 26, 2009

Related U.S. Application Data

(60) Provisional application No. 61/055,180, filed on May 22, 2008.

(51) Int. Cl.
*G06K 9/00* (2006.01)
(52) U.S. Cl. ........................................................ 382/133
(58) Field of Classification Search ........... 382/128–133
See application file for complete search history.

(56) References Cited

U.S. PATENT DOCUMENTS

| | | | | |
|---|---|---|---|---|
| 8,077,944 | B2 * | 12/2011 | Schummers | 382/128 |
| 2002/0141629 | A1 * | 10/2002 | Schreck | 382/131 |
| 2005/0010100 | A1 * | 1/2005 | Hornegger et al. | 600/407 |
| 2005/0083054 | A1 * | 4/2005 | Feiweier et al. | 324/307 |
| 2005/0201601 | A1 * | 9/2005 | Sun et al. | 382/128 |
| 2005/0240099 | A1 | 10/2005 | Sun et al. | |

OTHER PUBLICATIONS

Marie-Pierre Jolly, "Automatic Segmentation of the Left Ventricle in Cardiac MR and CT Images," International Journal of Computer Vision, vol. 70, No. 2, Nov. 2006.

* cited by examiner

*Primary Examiner* — Nathan Ha
(74) *Attorney, Agent, or Firm* — Donald B. Paschburg; F. Chau & Associates, LLC

(57) ABSTRACT

A method for automatically generating a myocardial perfusion map from a sequence of magnetic resonance (MR) images includes determining a region of interest (ROI) in a reference frame selected from a time series of myocardial perfusion MR image slices, registering each image slice in the time series of slices to the reference frame to obtain a series of registered ROIs, and using the series of registered ROIs to segment endo- and epi-cardial boundaries of a myocardium in the ROI.

14 Claims, 6 Drawing Sheets

SYSTEM AND METHOD FOR GENERATING MR MYOCARDIAL PERFUSION MAPS WITHOUT USER INTERACTION

CROSS REFERENCE TO RELATED UNITED STATES APPLICATIONS

This application claims priority from "Image Analysis Algorithms for Generating MR Myocardial Perfusion Maps without User Interaction", U.S. Provisional Application No. 61/055,180 of Sun, et al, filed May 22, 2008, the contents of which are herein incorporated by reference in their entirety.

TECHNICAL FIELD

This disclosure is directed to the automatic generation of magnetic resonance (MR) myocardial perfusion maps.

DISCUSSION OF THE RELATED ART

In physiology, perfusion is the process of nutritive delivery of arterial blood to a capillary bed in biological tissue. Perfusion scanning is the process by which this perfusion can be observed, recorded and quantified. Being able to observe and quantify perfusion in the human body has been an invaluable step forward in medicine. With the ability to ascertain data on the blood flow to vital organs such as the heart and the brain, physicians can make quicker and more accurate choices on treatment for patients. Perfusion scanning encompasses a wide range of medical imaging modalities, such as computed tomography (CT) and magnetic resonance imaging (MRI). There are several different techniques of detecting perfusion parameters with the use of MRI, the most common being dynamic susceptibility contrast imaging (DSC-MRI) and arterial spin labeling (ASL).

Dynamic perfusion magnetic resonance imaging (MRI) has demonstrated great potential for diagnosing cardiovascular and renovascular diseases. In cardiac perfusion, the contrast agent passes through the right ventricle to the left ventricle and then perfuses into the myocardium. In dynamic perfusion MRI, the organ under study is scanned rapidly and repeatedly following a bolus injection of a contrast agent. The kinematics of the contrast agent are reflected in the intensity changes of the obtained time series of MR images. Analysis of the dynamic behavior of the signal intensity can provide valuable functional information.

Myocardial perfusion scanning is a procedure that evaluates many heart conditions from coronary artery disease to hypertrophic cardiomyopathy. The function of the myocardium is also evaluated by calculating the left ventricular ejection fraction of the heart. Myocardial perfusion MR images are generally compromised by low signal-to-noise ratio (SNR) and poor spatial resolution relative to the size of potential ischemic regions due to rapid imaging on the order of 100-150 ms per image. For quantitative or semi-quantitative analysis of these images, parametric maps are often generated of parameters, such as upslope, peak intensity, and area under the curve. Current methods for parametric map generation require significant user interaction for registration or segmentation steps.

SUMMARY OF THE INVENTION

Exemplary embodiments of the invention as described herein generally include methods and systems for automatically generating myocardial perfusion maps from MRI volumetric datasets, by determining of a region of interest (ROI) around the heart, registering the ROI across an MR volumetric image sequence, and segmenting the ROI to detect the endo- and epicardial boundaries of the myocardium.

According to an aspect of the invention, there is provided a method for automatically generating a myocardial perfusion map from a sequence of magnetic resonance (MR) images, including determining a region of interest (ROI) in a reference frame selected from a time series of myocardial perfusion MR image slices, registering each image slice in the time series of slices to the reference frame to obtain a series of registered ROIs, and using the series of registered ROIs to segment endo- and epi-cardial boundaries of a myocardium in the ROI.

According to a further aspect of the invention, determining a region of interest (ROI) in a reference frame comprises cropping slices in the series of slices according to a temporal intensity variation at each pixel to obtain a global mask containing pixels exhibiting significant temporal intensity variation, selecting a range of candidate slices with superior contrast, detecting the LV blood pool and forming an LV mask in all candidate slices, selecting one candidate slice with a detected LV blood pool as the reference frame, detecting the right ventricle (RV) in the reference frame and forming an RV mask, estimating a thickness of the myocardium based on the detected LV and RV masks, and defining the ROI as a bounding box containing the LV, RV, and myocardium.

According to a further aspect of the invention, detecting the LV blood pool comprises, for each candidate slice, selecting an intensity threshold for the blood, using the threshold to obtain a binary image and removing small connected components from the binary image.

According to a further aspect of the invention, selecting one candidate slice as the reference frame comprises computing shape features for each remaining connected component to select a least eccentric, most circular, and most convex connected component, where the selected connected component among all among all candidate slices corresponds to the LV blood pool.

According to a further aspect of the invention, the blood intensity threshold is selected through Gaussian clustering.

According to a further aspect of the invention, the shape features include an eccentricity computed as a ratio between minimum and maximum radii on the connected components, a convexity computed as a ratio between an area of the connected component and an area of its convex hull, and a circularity of the convex hull defined as $4\pi$ times the area of the convex hull over a square of a perimeter of the convex hull.

According to a further aspect of the invention, when two connected components have similar shape features, a component with a larger area is selected.

According to a further aspect of the invention, detecting the RV comprises finding a connected component in the binary image that is close to the LV and has a large area.

According to a further aspect of the invention, segmenting endo- and epi-cardial boundaries of a myocardium in the ROI comprises initializing the endo-cardium and epi-cardium boundaries from the LV mask and myocardial thickness estimate, detecting the endo-cardium by minimizing an energy functional, masking out a left-ventricle (LV) blood pool inside of the endo-cardium from the image series, and detecting the epi-cardium by minimizing another energy functional, where each energy functional incorporates correlation information among pixels in a same slice as well as temporal correlations across the slices in the time series, prior shape information and anatomical constraints.

According to a further aspect of the invention, the energy functional for the endo-cardium is $E(C_1) = E_{seq}(C_1) + \lambda E_{img}(C_1) + \mu E_{int}(C_1) + \kappa E_{shape}(C_1)$, where $C_1$ is the endo-cardial boundary, $\lambda$, $\mu$, and $\kappa$ are parameters that control weights of different terms, where $$E_{seq}(C) = \int_{\Omega_{in}} w(x,y)d[\alpha dis^2(I(x,y), \bar{I}_{in}) + \beta dis^2(I(x,y), \bar{I}_{prior}) + \gamma dis^2(\bar{I}_{in}, \bar{I}_{prior})]dxdy +$$

$$\int_{\Omega_{out}} [w(x,y)dis^2(I(x,y), \bar{I}_{out})]dxdy,$$

where $$w(x,y) = \frac{\sum_{k=1}^{K}[I_k(x,y) - I_{base}(x,y)]}{\max_{(x,y)}\left|\sum_{k=1}^{K}[I_k(x,y) - I_{base}(x,y)]\right|},$$

$I_k(x,y)$ is the intensity of a pixel (x,y) in a kth slice of the time series, $I_{max}(x, y)$ is a baseline intensity for the pixel (x, y), $I(x, y)=[I_1(x, y), I_2(x, y), \ldots, I_K(x, y)]^T$ is a intensity-time curve for each pixel (x, y), $\bar{I}_{in}$ and $\bar{I}_{out}$ are average intensity-time vectors for region $\Omega_{in}$ and $\Omega_{out}$, respectively, $\Omega_{in}$ and $\Omega_{out}$ are the regions inside and outside boundary $C_1$, respectively, $\bar{I}_{prior}$ is a prior known average intensity-time curve inside boundary $C_1$, $$dis^2(I_1, I_2) = \frac{1}{2} - \frac{\langle \tilde{I}_1, \tilde{I}_2 \rangle}{2\|\tilde{I}_1\|_2\|\tilde{I}_2\|_2}$$

$$= \frac{\|\tilde{I}_1\|_2\|\tilde{I}_2\|_2 - \langle \tilde{I}_1, \tilde{I}_2 \rangle}{2\|\tilde{I}_1\|_2\|\tilde{I}_2\|_2}$$

where $\tilde{I}$ is a mean removed vector, and $\alpha$, $\beta$, and $\gamma$ are positive scalars that lie in [0, 1] and satisfy $\alpha+\beta+\gamma=1$, $$E_{img}(C) = \int_{\Omega_{in}} [\alpha(I_r(x,y) - m_{in})^2 + \beta(I_r(x,y) - m_{prior})^2 + \gamma(m_{in} - m_{prior})^2]dxdy +$$

$$\int_{\Omega_{out}} \left(\frac{I_r(x,y) - }{m_{out}}\right)^2 dxdy,$$

where $I_r$ is the reference frame, $m_{in}$ and $m_{out}$ are average intensities inside $\Omega_{in}$ and $\Omega_{out}$, respectively and $m_{prior}$ is a priori known average intensity inside curve $C_1$, $E_{int}=\int_{C_1}ds$, an arc length of boundary $C_1$, and $E_{shape}=\int_{C_1}D^2(x, y)ds$, where $D(x, y)$ is a distance between a pixel (x, y) in an elliptical prior shape and the estimated boundary $C_1$.

According to a further aspect of the invention, the method includes weighting each pixel on the endo-cardial boundary according to its distance to a convex hull of endo-cardial boundary, where pixels closer to the convex hull have a greater weight.

According to a further aspect of the invention, the energy functional for the epi-cardium is $E(C_2)=E_{seq}(C_2)+\lambda E_{img}(C_2)+\mu E_{int}(C_2)+\eta E_{shape}(C_2)+E_{con}(C_2)$, where $C_2$ is the epi-cardial boundary, $\lambda$, $\mu$, and $\kappa$ are parameters that control weights of different terms, where $$E_{seq}(C) = \int_{\Omega_{in}} w(x,y)[\alpha dis^2(I(x,y), \bar{I}_{in}) + \beta dis^2(I(x,y), \bar{I}_{prior}) + \gamma dis^2(\bar{I}_{in}, \bar{I}_{prior})]dxdy +$$

$$\int_{\Omega_{out}} [w(x,y)dis^2(I(x,y), \bar{I}_{out})]dxdy,$$

where $$w(x,y) = \frac{\sum_{k=1}^{K}[I_k(x,y) - I_{base}(x,y)]}{\max_{(x,y)}\left|\sum_{k=1}^{K}[I_k(x,y) - I_{base}(x,y)]\right|},$$

$I_k(x, y)$ is the intensity of a pixel (x, y) in a kth slice of the time series, $I_{base}(x, y)$ is a baseline intensity for the pixel (x, y), $I(x, y)=[I_1(x, y), I_2(x, y), \ldots, I_K(x, y)]^T$ is a intensity-time curve for each pixel (x, y), $\bar{I}_{in}$ and $\bar{I}_{out}$ are average intensity-time vectors for region $\Omega_{in}$ and $\Omega_{out}$, respectively, $\Omega_{in}$ and $\Omega_{out}$ are regions inside and outside boundary $C_2$, respectively, and $\Omega_{in}$ excludes a region inside the endo-cardium boundary $C_1$, $\bar{I}_{prior}$ is a prior known average intensity-time curve inside boundary $C_2$, $$dis^2(I_1, I_2) = \frac{1}{2} - \frac{\langle \tilde{I}_1, \tilde{I}_2 \rangle}{2\|\tilde{I}_1\|_2\|\tilde{I}_2\|_2}$$

$$= \frac{\|\tilde{I}_1\|_2\|\tilde{I}_2\|_2 - \langle \tilde{I}_1, \tilde{I}_2 \rangle}{2\|\tilde{I}_1\|_2\|\tilde{I}_2\|_2}$$

where $\tilde{I}$ is a mean removed vector, and $\alpha$, $\beta$, and $\gamma$ are positive scalars that lie in [0, 1] and satisfy $\alpha+\beta+\gamma=1$, $$E_{img}(C) = \int_{\Omega_{in}} [\alpha(I_r(x, y) - m_{in})^2 + \beta(I_r(x, y) - m_{prior})^2 + \gamma(m_{in} - m_{prior})^2] dx dy +$$
$$\int_{\Omega_{out}} (I_r(x, y) - m_{out})^2 dx dy,$$

where $I_r$ is the reference frame, $m_{in}$ and $m_{out}$ are average intensities inside $\Omega_{in}$ and $\Omega_{out}$, respectively and $m_{prior}$ is a priori known average intensity inside curve $C_1$,
$E_{int} = \int_{C_2} ds$, an arc length of boundary $C_2$, $E_{shape} = \int_{C_2} D^2(x, y) ds$, where $D(x, y)$ is a distance between pixel $(x, y)$ and the estimated boundary $C_2$, and $E_{con} = \int_{C_2} f[d_1(x, y)] ds$, where $d_1(x, y)$ is a distance between a point $(x, y)$ on $C_2$ and $C_1$, and $$f[d_1(x, y)] = \begin{cases} 0, & \text{if } d_{min} \le d_1(x, y) \le d_{max} \\ \infty, & \text{otherwise} \end{cases},$$

where $d_{min}$ and $d_{max}$ are minimum and maximum allowed myocardium thicknesses, respectively.

According to another aspect of the invention, there is provided a method of automatically generating a myocardial perfusion map from a sequence of magnetic resonance (MR) volumetric images, including providing a time series of registered myocardial perfusion MR image slices having reference image with a masked left ventricle (LV), detecting the right ventricle (RV) in the reference frame and estimating a thickness of the myocardium based on the detected LV and RV, initializing the endo-cardium and epi-cardium boundaries from the LV mask and myocardial thickness estimate, segmenting the endo-cardium by minimizing an energy functional, masking out a left-ventricle (LV) blood pool inside of the endo-cardium from the image series, and segmenting the epi-cardium by minimizing another energy functional, where each energy functional incorporates correlation information among pixels in a same slice as well as temporal correlations across the slices in the time series, prior shape information and anatomical constraints.

According to a further aspect of the invention, providing a time series of registered myocardial perfusion MR image slices comprises providing a time series of myocardial perfusion MR image slices, determining a region of interest (ROI) in a reference frame selected from the time series, and registering each image slice in the time series of slices to the reference frame to obtain a series of registered ROIs, where the series of registered ROIs are used to segment endo- and epi-cardial boundaries of a myocardium in the ROI.

According to another aspect of the invention, there is provided a program storage device readable by a computer, tangibly embodying a program of instructions executable by the computer to perform the method steps for automatically generating a myocardial perfusion map from a sequence of magnetic resonance (MR) images.

DETAILED DESCRIPTION OF EXEMPLARY EMBODIMENTS

Figure 1:
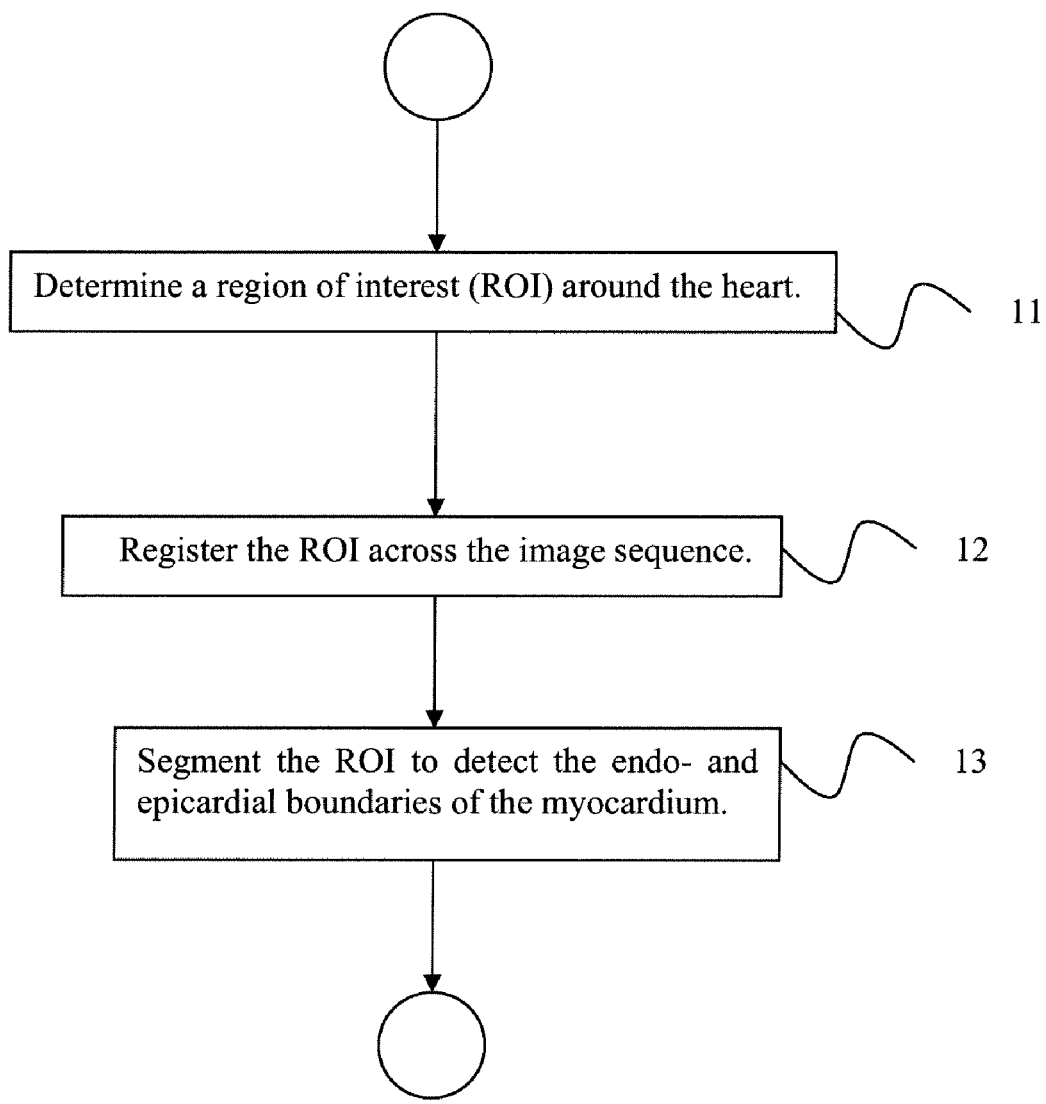
FIG. 1 is a flowchart of a method for mapping myocardial perfusion MR images, according to an embodiment of the invention.

Exemplary embodiments of the invention as described herein generally include systems and methods for automatically generating magnetic resonance (MR) myocardial perfusion maps. Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

As used herein, the term "image" refers to multi-dimensional data composed of discrete image elements (e.g., pixels for 2-D images and voxels for 3-D images). The image may be, for example, a medical image of a subject collected by computer tomography, magnetic resonance imaging, ultrasound, or any other medical imaging system known to one of skill in the art. The image may also be provided from non-medical contexts, such as, for example, remote sensing systems, electron microscopy, etc. Although an image can be thought of as a function from $R^3$ to R, the methods of the inventions are not limited to such images, and can be applied to images of any dimension, e.g., a 2-D picture or a 3-D volume. For a 2- or 3-dimensional image, the domain of the image is typically a 2- or 3-dimensional rectangular array, wherein each pixel or voxel can be addressed with reference to a set of 2 or 3 mutually orthogonal axes. The terms "digital" and "digitized" as used herein will refer to images or volumes, as appropriate, in a digital or digitized format acquired via a digital acquisition system or via conversion from an analog image.

According to an embodiment of the invention, the following steps in the analysis of myocardial perfusion MR images can be automated. These steps are depicted in the flowchart of FIG. 1. Referring to the figure, given a time series of myocardial perfusion MR images, an automated method begins at step 11 by determining a region of interest (ROI), i.e., a bounding box around the heart. At step 12, registration of the ROI across an image sequence is performed, and, at step 13, the ROI is segmented to detect the endo- and epicardial boundaries of the myocardium.

Determination of ROI

Given a time-series of myocardial perfusion MR images of a single slice, it is desired to automatically select a reference frame and generate a rectangular ROI that tightly contains the left ventricle in the reference frame. The ROI is then used for registration across frames followed by the segmentation of the endo- and epicardial contours. An exemplary, non-limiting time series would comprise about 40-60 MR frames.

This task is challenging for several reasons. The contrast of the MR images varies significantly, as images acquired before the contrast agent washes in have poor contrast, while images acquired after the wash-in have much better contrast. Hence a selected reference frame should have good contrast. In addition, the left ventricle blood pool and myocardium are not the only structures whose intensities change over time, as the right ventricle and other structures also respond to the contrast agent. Finally, the image sequence often experiences significant patient breathing motion. As a result, techniques such as maximum intensity projection to produce a feature image for the detection of the left ventricle (LV) cannot be used.

Among all the images in the time-series, there generally exists a few images that have good contrast. In these images, the intensity of the left ventricle blood pool is higher than the rest of the structures. In addition, the shape of the left ventricle blood pool is always ellipse-like if not circular. For these reasons, according to an embodiment of the invention, the heart can be located by finding the left ventricle (LV) blood pool in a high contrast images selected as a reference image.

Figure 2:
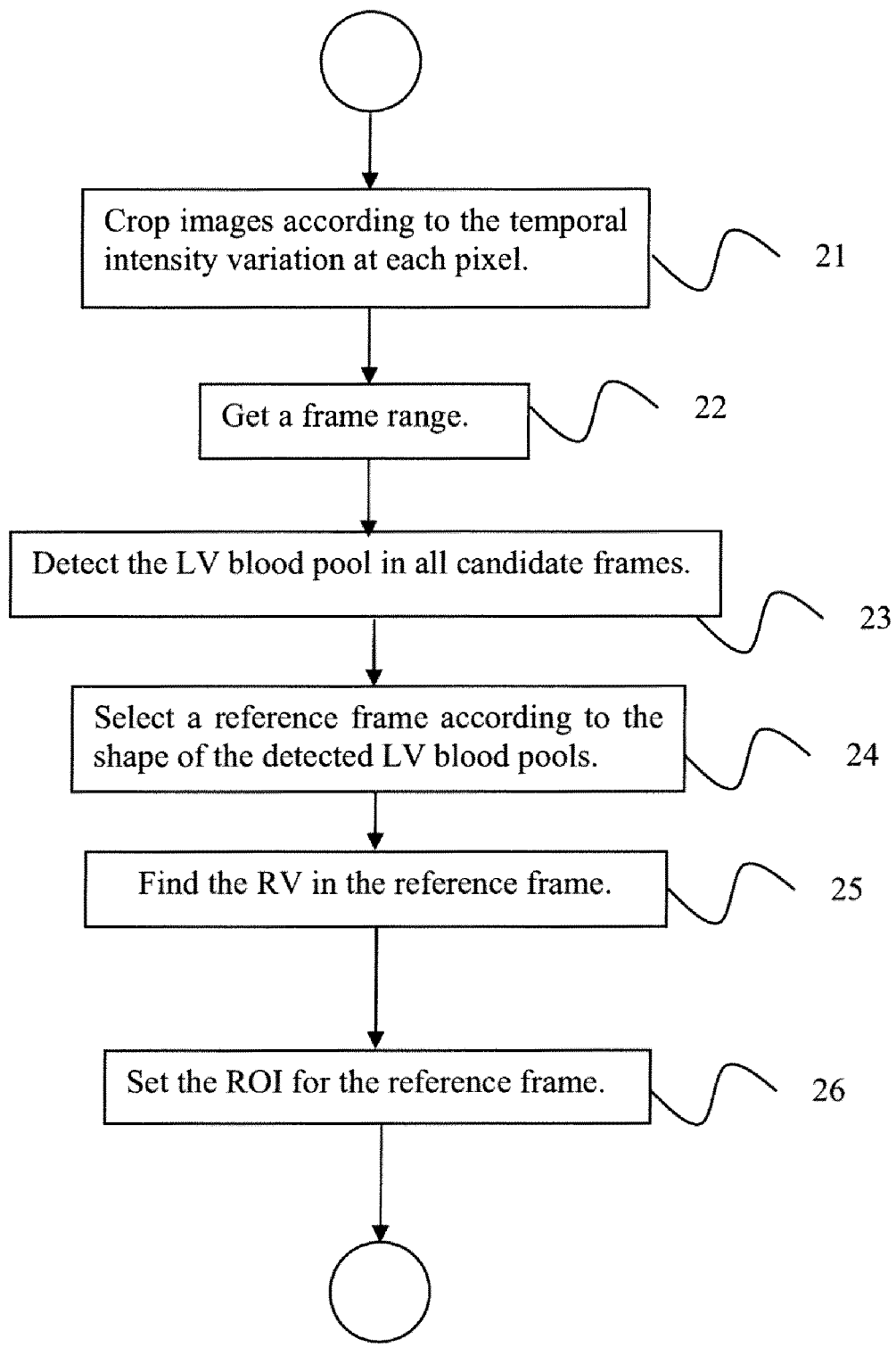
FIG. 2 is a flowchart of a method for determining a region-of-interest in a reference frame, according to an embodiment of the invention.

FIG. 2 is a flowchart of a method for determining a region-of-interest in a reference frame, according to an embodiment of the invention. Referring now to the figure, given an MR image sequence, a method begins at step 21 by cropping images according to the temporal intensity variation at each pixel to obtain a global mask containing pixels exhibiting significant temporal intensity variation. According to the average intensity within the global mask at each frame, a range of frames with good contrast is selected at step 22. At step 23, the LV blood pool is detected in all candidate frames. Detecting the blood pool begins by, for each selected frame, selecting an intensity threshold for the blood through Gaussian clustering, and obtaining a binary image by thresholding. After removing small connected components, three shape features are computed for each remaining connected component: (1) the eccentricity is computed as the ratio between the minimum and the maximum radii on the connected component; (2) the convexity is computed as the ratio between the area of the connected component and the area of its convex hull; and (3) the circularity of the convex hull is defined as $4\pi$ times its area over the square of its perimeter. The least eccentric, most circular, and most convex connected component is sought. The winning connected component among all frames is assumed to correspond to the LV blood pool. In addition, when two connected components have similar shape features, the component with a larger area is favored to avoid mistaking the aorta as the heart. At step 24, the frame containing the winning component is selected as the reference frame, and the reference frame is used to estimate the thickness of the myocardium. The right ventricle (RV) is then found at step 25. Once the LV has been detected, the RV is then the connected component in the binary image that is close to the LV and at the same time has a fairly large area. The thickness of the myocardium can be estimated based on the detected LV and RV masks. An appropriate margin is set according to the estimated thickness as well as the area of the LV. Once the masks for the LV and RV blood pool and the estimated thickness of the myocardium have been determined, one can determine at step 26 a bounding box that defines an ROI containing the LV.

Registration of the ROI

For quantitative or semi-quantitative analysis of cardiac perfusion images, registration should be performed to minimize the errors due to respiratory motion. According to an embodiment of the invention, a rigid body registration of the ROI is performed for each slice position. Each individual time frame is registered with respect to a reference image, a process sometimes referred to as tracking the ROI.

An exemplary registration method according to an embodiment of the invention is as follows. This algorithm is disclosed in the assignee's pending application, "Contrast-invariant registration of cardiac and renal magnetic resonance perfusion images", U.S. patent application Ser. No. 11/078,035, filed Mar. 11, 2005, the contents of which are herein incorporated by reference in their entirety. An algorithm begins, given an ROI in one frame, by finding the best match to the selected ROI in the other frames. According to an embodiment of the invention, it is assumed that the motion is reduced to translation with integer pixel shifts. Registering the ROI is achieved by simple template matching. Since the orientations of the edges along tissue boundaries are always parallel across the image sequence, despite the fact that the relative intensities between tissues vary with time, a template defined by the orientation of the image gradient is chosen.

In this formulation, the image on which the ROI is manually cropped is called the reference frame. Let $\theta_r(x, y)$ and $M_r(x, y)$ represent the direction and the magnitude, respectively, of the image gradient at pixel (x, y) in the reference frame. One can obtain $\theta_r(x, y)$ and $M_r(x, y)$ using, for example, a Sobel edge detector as is known in the art, although any edge detector may be used according to other embodiments of the invention. The set of pixels in the ROI is denoted as $R=\{(x, y) | x_a \leq x \leq x_b, y_a \leq y \leq y_b\}$, where $(x_a, y_a)$ and $(x_b, x_b)$ are the diagonal points that specify the bounding box of the ROI. Let $\theta_1(x, y)$ denote the edge orientation and $M_c(x, y)$ the edge magnitude at pixel (x, y) in the current frame. For each offset pair (dx, dy), the angle difference $\Delta\theta(x, y; dx, dy)$ and a weight function $w(x, y; dr, dy)$ are defined by:

$$\Delta\theta(x, y; dx, dy) = \theta_c(x + dx, y + dy) - \theta_r(x, y), \qquad (1)$$

$$w(x, y; dx, dy) = \frac{M_c(x + dx, y + dy)M_r(x, y)}{\sum_{(x,y) \in R} M_c(x + dx, y + dy)M_r(x, y)}. \qquad (2)$$

A similarity metric is introduced:

$$S(dx, dy) = \sum_{(x,y) \in R} w(x, y; dx, dy)\cos(2\Delta\theta(x, y; dx, dy)). \qquad (3)$$

Note that S(dx, dy) is the weighted average of the values of $\cos(2\Delta\theta)$ over the ROI, and its value lies in the interval of [−1, 1]. The cosine of the double angle is used to handle contrast inversions that commonly occur in perfusion studies. In addition, the weight function is chosen as the normalized product of the edge magnitudes because it is desirable for the ROI to be attracted to strong edges in the current frame that are mostly parallel to the strong edges in the reference frame. The exemplary similarity metric is invariant to rapidly changing image contrast, in the sense that its value is insensitive to changes in the contrast as long as the edge orientations are nearly parallel to those of the template. The integer shifts (dx*, dy*) that maximize S are determined by exploring all possible solutions (dx, dy) over a reasonable search space. Note that the value of S(dx*, dy*) also plays a role as a confidence measure. To improve the robustness of the algorithm, both the previous frame and the reference frame are used as templates, choosing the match with maximum similarity metric. To further improve the accuracy of the registration results, a local affine transformation of the heart is estimated by incorporating the knowledge of the contours delineating organ boundaries in the reference frame.

Segmentation of the ROI

The registered ROI sequence may then used to detect the inner and outer boundaries of the myocardium. However, in dynamic MR perfusion image sequences, it can be challenging to distinguish different anatomical structures based on each individual frame, mostly due to a lack of contrast along some boundary segments. However, successful registration of the ROI enables the use of the entire MR image sequence in the segmentation. To use all the information available, an image segmentation method according to an embodiment of the invention uses not only the spatial information provided by each single image in the MR image sequence but also the temporal information available, in particular, the intensity-time curves. This is motivated by the following observation.

Figure 4:
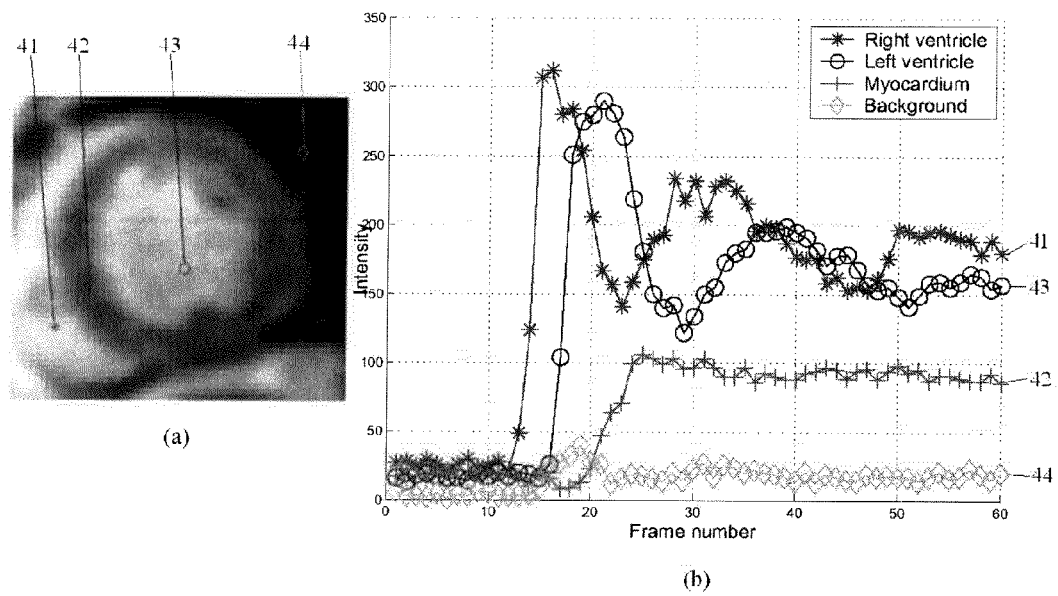
FIGS. 4(a)-(b) illustrate the intensity-time curves of 4 pixels across an image sequence, according to an embodiment of the invention.

FIGS. 4(a)-(b) illustrates the intensity-time curves of 4 pixels 41, 42, 43, 44 across the image sequence respectively located at the right ventricle 41, left ventricle 43, myocardium 42, and background 44. FIG. 4(a) depicts the selected pixels, while FIG. 4(b) graphs the intensity-time curves for the selected pixels. These dynamic sequences are all quite distinct. For example, the intensity of the right ventricle and the left ventricle pixels show pronounced oscillations and exhibit different wash-in timings, whereas the intensity of the background pixel is very noise like. This suggests that one can distinguish between the heart and other anatomical structures based on temporally distinct patterns of their intensity-time curves. In addition, structures within the heart, such as the left ventricle cavity and myocardium can also be distinguished based on their temporal responses.

A segmentation algorithm according to an embodiment of the invention can exploit all the information available, spatially or intra-image, as well as temporally or across the images of the sequence, and can be tuned to the specificity of cardiac MR perfusion images. Since the contrast at the endocardial boundary is generally better than that at the epicardial boundary, an algorithm according to an embodiment of the invention first segments the endocardium and then segments the epicardium utilizing the results of endocardium segmentation.

A segmentation algorithm according to an embodiment of the invention includes 2 steps: first, detecting the inner boundary (endo); then, masking out the LV blood pool (inside of the inner boundary) from the image sequence and detecting the epi-cardium. Contours are initialized using the LV blood pool and myocardial thickness estimates obtained above. According to an embodiment of the invention, segmentation is formulated as an energy minimization problem. Since the intensity-time profiles for pixels in the LV, RV and myocardium are quite different, energy functionals are introduced that exploit the difference in the dynamics of the temporal signals associated with distinct pixels. The energy functionals for the two segmentation tasks follow a general form, but with special variations in either case to address their unique challenges. An energy-based image segmentation algorithm according to an embodiment of the invention uses the correlation information among pixels in the same image as well as the temporal correlation across the images in the sequence. It also exploits prior shape information and anatomical constraints.

Because the two boundary contours are initialized according to the mask for the LV blood pool and the estimated thickness of the myocardium, the initial contours are very close to the true boundaries. Therefore, only a small number of iterations are needed for the energy minimization step to converge.

Figure 5:
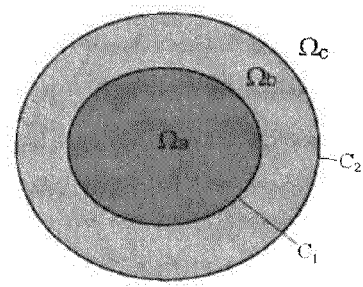
FIG. 5 illustrates the blood pool, myocardium, and background regions, according to an embodiment of the invention.

NOTATION: Let $I_k: \Omega \epsilon R^2 \to R$ denote the $k^{th}$ frame in the image sequence of the ROI to be segmented, $k=1, 2, \ldots, K$, and $I_k(x, y)$ represent the intensity of the pixel at $(x, y)$. Here K represents the total number of the frames in the image sequence. Let $C \in Q$ be a closed contour. Let $C_1$ and $C_2$ denote respectively the evolving endocardial and epicardial contours in the reference frame. These two contours partition the image domain Q into three disjoint regions that correspond respectively to the blood pool, the myocardium, and the background. FIG. 5 illustrates the blood pool $\Omega_a=\text{inside}(C_1)$, the myocardium $\Omega_b=\text{outside}(C_1) \cap \text{inside}(C_2)$, and the background regions $\Omega_c=\text{outside}(C_2)$.

ENERGY FUNCTIONAL: A general energy functional according to an embodiment of the invention is defined as:

$$E(C)=E_{seq}(C)+\lambda E_{img}(C)+\mu E_{int}(C)+\kappa E_{shape}(C), \quad (4)$$

where $E_{seq}$ accounts for the temporal dynamics in the images sequence, $E_{img}$ incorporates the spatial information in the reference frame, $E_{int}$ is the internal energy that regulates the smoothness of the contours, $E_{shape}$ penalizes the shape difference between the evolving contour and a prior shape model, and $\lambda$, $\mu$, and $\kappa$ are parameters that control the weights of different terms. Next, each of these energy terms will be described in detail.

$E_{seq}(C)$: Since different anatomical structures can be distinguished based on distinct temporal dynamics of the intensity-time curves, this term exploits the temporal information across the image sequence. First a metric is introduced that characterizes the distance between two dynamic signals to quantify the dissimilarity between different types of temporal responses. Recall that $I_k(x, y)$ denotes the intensity at pixel $(x, y)$ in frame k. According to an embodiment of the invention, the intensity-time curve at each pixel $(x, y)$ can be represented using a column vector:

$$I(x,y)=[I_1(x,y), I_2(x,y), \ldots, I_K(x,y)]^T.$$

Let $\theta$ denote the angle between two arbitrary vectors $I_1$ and $I_2$. According to an embodiment of the invention, a distance function between the two vectors can be defined as $$dis(I_1, I_2) = \left|\sin\frac{\theta}{2}\right| \quad (5)$$

$$= \sqrt{\frac{1-\cos\theta}{2}},$$

where $\cos\theta$ is given by the correlation coefficient between the mean removed vectors $\tilde{I}_1$ and $\tilde{I}_2$ (the mean removed vectors are the vectors after subtracting the mean intensity for each particular vector), as the temporal dynamics are of interest instead of the absolute intensity. The correlation coefficient is given by $$\cos\theta = \frac{\langle \tilde{I}_1, \tilde{I}_2 \rangle}{\|\tilde{I}_1\|_2 \|\tilde{I}_2\|_2}, \quad (6)$$

with $\langle\rangle$ denoting the inner product and $\|\ \|_2$ the Euclidean $L_2$ norm.

According to an embodiment of the invention, it is assumed that there are two regions in the image domain whose temporal signals closely follow two different dynamic profiles. Let $\Omega_{in}$=inside(C) and $\Omega_{out}$=outside(C) represent the regions inside and outside curve C, respectively. Let $\bar{I}_{prior}$ denote the prior known average intensity-time curve for the object (inside curve C). In endocardium (epicardium) segmentation, $\bar{I}_{prior}$ can be estimated using the initial mask for the blood pool (myocardium).

To avoid meaningless noise incurred by regions exhibiting little temporal dynamics, a spatially varying weight is assigned to each pixel that lies between 0 and 1. The weight w(x, y) is defined as $$w(x, y) = \frac{Q(x, y)}{\max_{(x,y)} |Q(x, y)|}, \quad (7)$$

$$Q(x, y) = \sum_{k=1}^{K} [I_k(x, y) - I_{base}(x, y)],$$

where $I_{base}(x, y)$ is the baseline intensity for pixel (x, y), obtained by averaging the corresponding pixel intensities in the first few frames.

The energy term $E_{seq}(C)$ is thus given by $$E_{seq}(C) = \int_{\Omega_{in}} w(x, y)[\alpha dis^2(I(x, y), \bar{I}_{in}) + \beta dis^2(I(x, y), \bar{I}_{prior}) + \gamma dis^2(\bar{I}_{in}, \bar{I}_{prior})]dxdy + \quad (8)$$
$$\int_{\Omega_{out}} [w(x, y)dis^2(I(x, y), \bar{I}_{out})]dxdy,$$

where $\bar{I}_{int}$ and $\bar{I}_{out}$ are the average intensity-time vectors for region $\Omega_{in}$ and $\Omega_{out}$, respectively. $\alpha$, $\beta$, and $\gamma$ are positive scalars that lie in [0, 1], and satisfy $\alpha+\beta+\gamma=1$. According to an embodiment of the invention, $\alpha$ may be chosen to be greater than 0.5. The distance functions are computed using EQS. (5) and (6). The integrals in EQ. (8) sum over the pixels in the respective regions, while the distances in the integrands sum over the frames in the sequence.

$E_{img}(C)$: This energy term exploits spatial (intra-image) information in the reference frame $I_r$. Assuming $I_r$ is formed by two regions of approximately piecewise-constant intensities of distinct values, similar to EQ. (8), according to an embodiment of the invention, a region-based energy term $E_{img}(C)$ can be defined as $$E_{img}(C) = \int_{\Omega_{in}} [\alpha(I_r(x, y) - m_{in})^2 + \beta(I_r(x, y) - m_{prior})^2 + \gamma(m_{in} - m_{prior})^2]dxdy + \quad (9)$$
$$\int_{\Omega_{out}} (I_r(x, y) - m_{out})dxdy$$

where $m_{in}$ and $m_{out}$ are the average intensities inside $\Omega_{in}$ and $\Omega_{out}$, respectively; $m_{prior}$ is the priori known average intensity for the object (inside curve C). In endocardium (epicardium) segmentation, $m_{prior}$ can be estimated using the initial mask for the blood pool (myocardium).

$E_{int}(C)$: According to an embodiment of the invention, the contour may be smoothed by minimizing its total arc length, using the internal energy term:

$$E_{int} = \int_C ds \quad (10)$$

where ds represents the infinitesimal Euclidean arc length of the contour.

$E_{shape}(C)$: Because both endocardium and epicardium resemble ellipses, one can use an elliptical shape prior and penalize the squared distance between contour C and the ellipse estimated from C by direct least square fitting of ellipses:

$$E_{shape} = \int_C D^2(x,y)ds, \quad (11)$$

where D(x, y) is the distance between (x, y) and the estimated ellipse.

SEGMENTATION OF THE ENDOCARDIUM: An energy functional according to an embodiment of the invention for endocardium segmentation follows the formulation in EQ. (4). In particular, $\Omega_{in}$=inside($C_1$)=$\Omega_a$ and $\Omega_{out}$=outside($C_1$)= $\Omega_b \cup \Omega_c$, as shown in FIG. 5.

Figure 3:
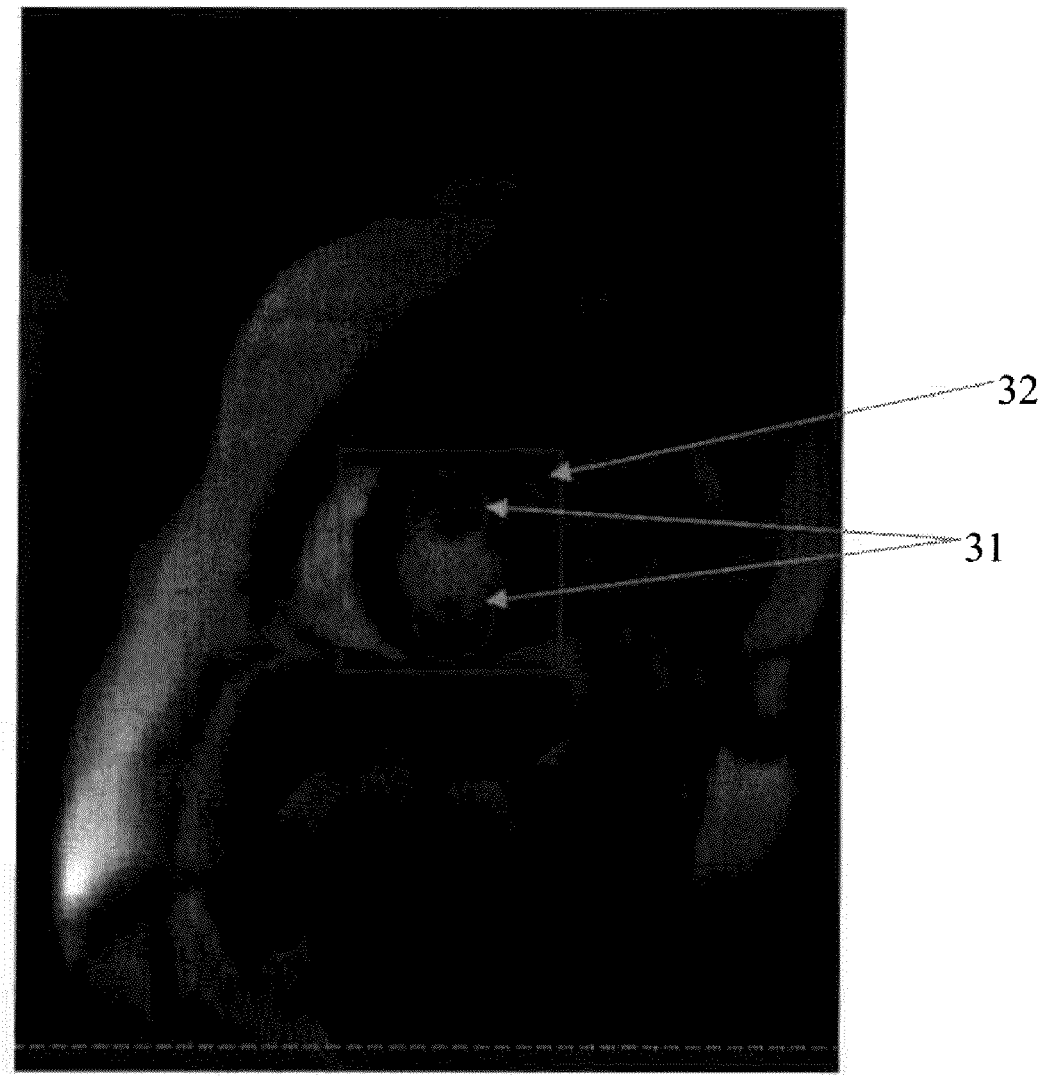
FIG. 3 depicts papillary muscles in the heart, according to an embodiment of the invention.

Papillary muscles, which support the function of the valve, present certain issues. Papillary muscles are depicted in FIG. 3 by the circled area 31 within an ROI 32. These muscles have the same intensity as the myocardium (heart wall) and are sometimes completely surrounded by (bright) blood, and sometimes blend into the wall. This can change during the heart cycle and a registration algorithm according to an embodiment of the invention should not be mislead, i.e. it should consistently use the endocardial boundary. To address this issue, according to an embodiment of the invention, a weighted ellipse fitting method is used, in which each point on the contour was weighted according to its distance to the convex hull of the evolving contour $C_1$: the closer to the convex hull, the higher the weight.

SEGMENTATION OF THE EPICARDIUM: An energy functional according to an embodiment of the invention for epicardium segmentation has an additional term that imposes anatomical constraints about the myocardium thickness, that the distance between the endocardium and the epicardium is relatively constant. In this case, $C_1$ is given from the results of endocardium segmentation. Hence $\Omega_{in}$=$\Omega_b$ and $\Omega_{out}$=$\Omega_c$, as shown in FIG. 5.

Let $d_1(x, y)$ denote the distance between point (x, y) and $C_1$. To take advantage of the prior knowledge that the distance between the endocardium and the epicardium is relatively constant, an energy term $E_{con}$ is introduced as $$E_{con} = \int_{C_2} f[d_1(x,y)]ds, \quad (12)$$

where $$f[d_1(x, y)] = \begin{cases} 0, & \text{if } d_{min} \leq d_1(x, y) \leq d_{max}, \\ \infty, & \text{otherwise.} \end{cases} \quad (13)$$

In EQ. (13), $d_{min}$ and $d_{max}$ are respectively the minimum and the maximum allowed myocardium thickness, which can be set according to the estimated myocardium thickness.

Results

Figure 6:
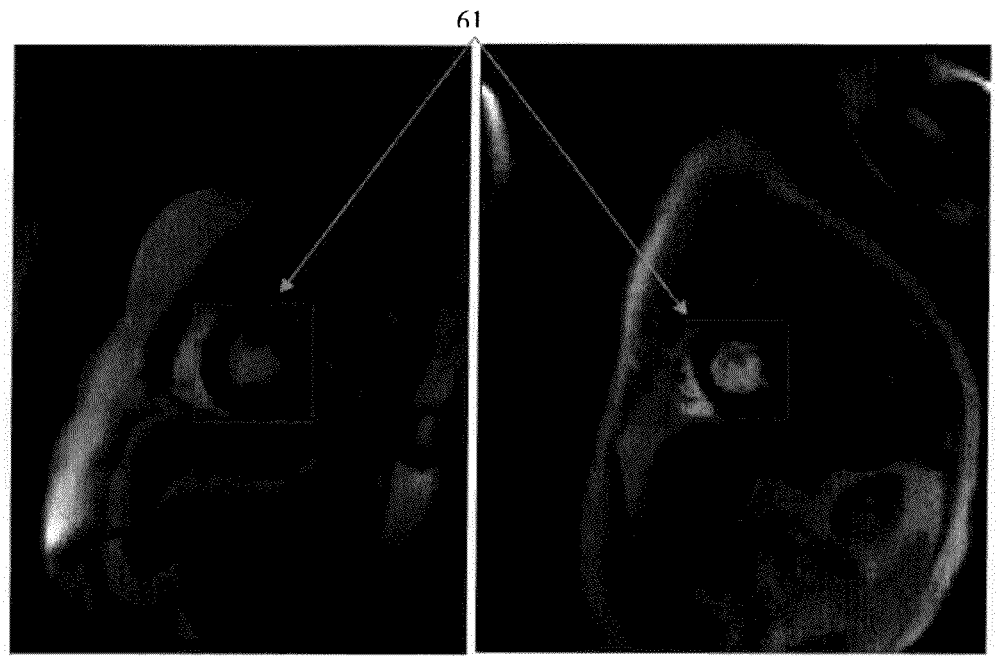
FIG. 6 illustrates sample results of a region-of-interest (ROI) determination, according to an embodiment of the invention.
Figure 7:
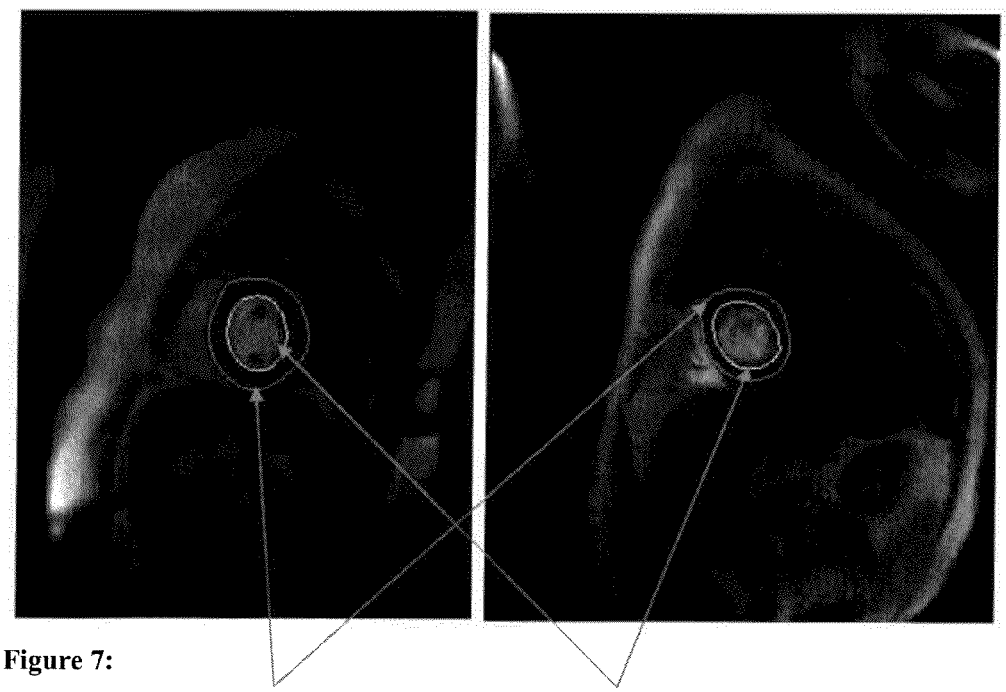
FIG. 7 illustrates sample segmentation results, according to an embodiment of the invention.

FIG. 6 shows detected ROIs 61 overlaid on the reference frame for two cardiac MR perfusion sequences. In each sequence, the reference frame and the ROI were automatically determined by an algorithm according to an embodiment of the invention without any user input. FIG. 7 displays the segmentation results for the registered ROI sequence from FIG. 6, depicting the endocardial contour 71 and the epicardial contour 72.

System Implementations

It is to be understood that embodiments of the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

Figure 8:
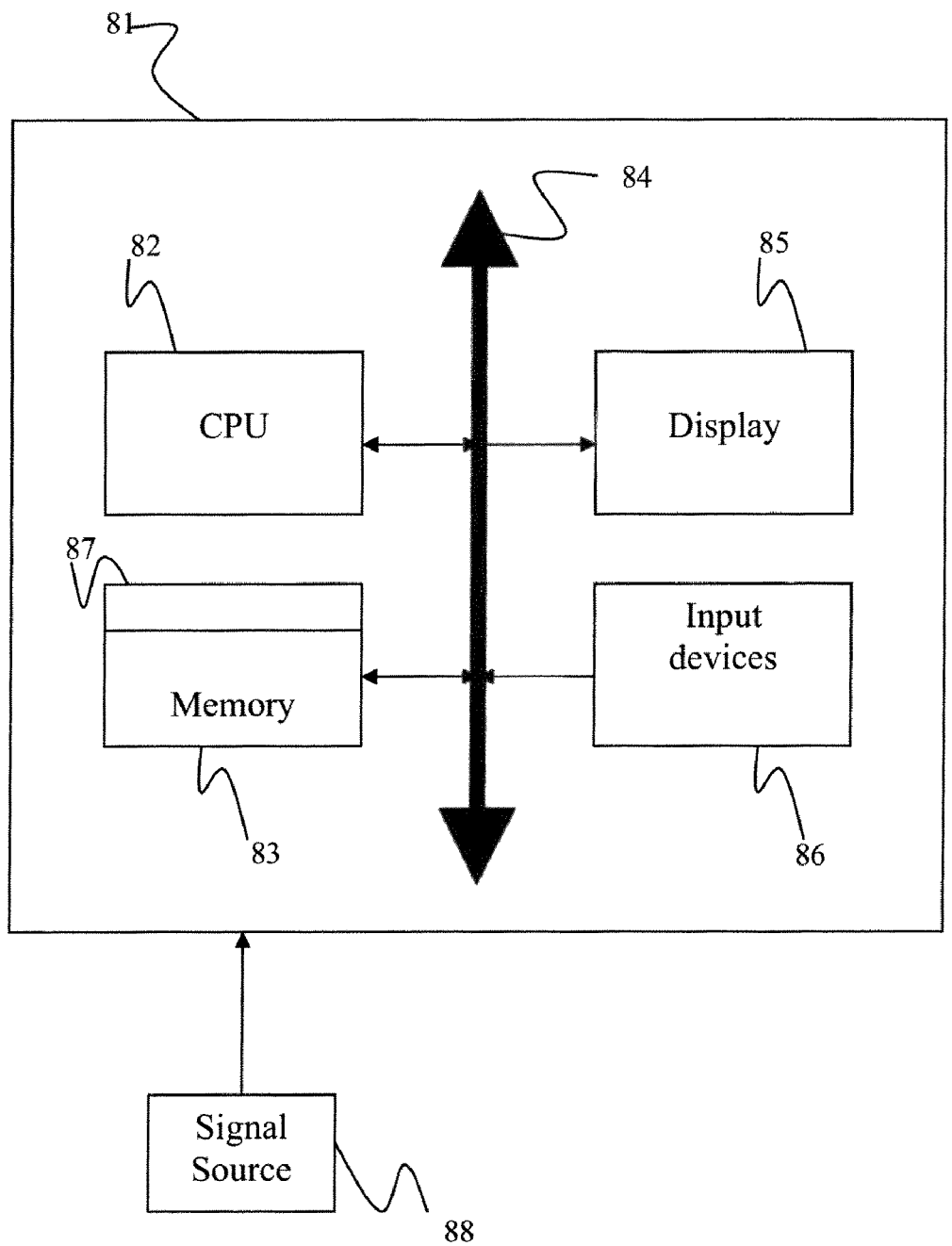
FIG. 8 is a block diagram of an exemplary computer system for implementing a method for automatically generating magnetic resonance (MR) myocardial perfusion maps, according to an embodiment of the invention.

FIG. 8 is a block diagram of an exemplary computer system for implementing a method for automatically generating magnetic resonance (MR) myocardial perfusion maps according to an embodiment of the invention. Referring now to FIG. 8, a computer system 81 for implementing the present invention can comprise, inter alia, a central processing unit (CPU) 82, a memory 83 and an input/output (I/O) interface 84. The computer system 81 is generally coupled through the I/O interface 84 to a display 85 and various input devices 86 such as a mouse and a keyboard. The support circuits can include circuits such as cache, power supplies, clock circuits, and a communication bus. The memory 83 can include random access memory (RAM), read only memory (ROM), disk drive, tape drive, etc., or a combinations thereof. The present invention can be implemented as a routine 87 that is stored in memory 83 and executed by the CPU 82 to process the signal from the signal source 88. As such, the computer system 81 is a general purpose computer system that becomes a specific purpose computer system when executing the routine 87 of the present invention.

The computer system 81 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

While the present invention has been described in detail with reference to a preferred embodiment, those skilled in the art will appreciate that various modifications and substitutions can be made thereto without departing from the spirit and scope of the invention as set forth in the appended claims.

What is claimed is:

1. A method of automatically generating a myocardial perfusion map from a sequence of magnetic resonance (MR) images, said method comprising the steps of:
    determining a region of interest (ROI) in a reference frame selected from a time series of myocardial perfusion MR image slices;
    registering each image slice in said time series of slices to the reference frame to obtain a series of registered ROIs; and
    using the series of registered ROIs to segment endo- and epi-cardial boundaries of a myocardium in the ROI.

2. The method of claim 1, wherein determining a region of interest (ROI) in a reference frame comprises:
    cropping slices in said series of slices according to a temporal intensity variation at each pixel to obtain a global mask containing pixels exhibiting significant temporal intensity variation;
    selecting a range of candidate slices with superior contrast;
    detecting the LV blood pool and forming an LV mask in all candidate slices;
    selecting one candidate slice with a detected LV blood pool as the reference frame;
    detecting the right ventricle (RV) in the reference frame and forming an RV mask;
    estimating a thickness of the myocardium based on the detected LV and RV masks; and
    defining the ROI as a bounding box containing the LV, RV, and myocardium.

3. The method of claim 2, wherein detecting the LV blood pool comprises, for each candidate slice, selecting an intensity threshold for the blood, using said threshold to obtain a binary image and removing small connected components from said binary image.

4. The method of claim 3, wherein selecting one candidate slice as the reference frame comprises computing shape features for each remaining connected component to select a least eccentric, most circular, and most convex connected component, wherein the selected connected component among all among all candidate slices corresponds to the LV blood pool.

5. The method of claim 3, wherein said blood intensity threshold is selected through Gaussian clustering.

6. The method of claim 4, wherein said shape features include an eccentricity computed as a ratio between minimum and maximum radii on the connected components, a convexity computed as a ratio between an area of the connected component and an area of its convex hull, and a circularity of the convex hull defined as $4\pi$ times the area of the convex hull over a square of a perimeter of said convex hull.

7. The method of claim 4, wherein when two connected components have similar shape features, a component with a larger area is selected.

8. The method of claim 2, wherein detecting the RV comprises finding a connected component in the binary image that is close to the LV and has a large area.

9. The method of claim 2, wherein segmenting endo- and epi-cardial boundaries of a myocardium in the ROI comprises:
    initializing the endo-cardium and epi-cardium boundaries from the LV mask and myocardial thickness estimate;

detecting the endo-cardium by minimizing an energy functional;

masking out a left-ventricle (LV) blood pool inside of the endo-cardium from the image series, and detecting the epi-cardium by minimizing another energy functional, wherein each said energy functional incorporates correlation information among pixels in a same slice as well as temporal correlations across the slices in the time series, prior shape information and anatomical constraints.

10. The method of claim 9, wherein the energy functional for the endo-cardium is $E(C_1)=E_{seq}(C_1)+\lambda E_{img}(C_1)+\mu E_{int}(C_1)+\kappa E_{shape}(C_1)$,
wherein $C_1$ is the endo-cardial boundary, $\lambda$, $\mu$, and $\kappa$ are parameters that control weights of different terms, wherein $$E_{seq}(C) = \int_{\Omega_{in}} w(x, y)[\alpha dis^2(I(x, y), \bar{I}_{in}) + \beta dis^2(I(x, y), \bar{I}_{prior}) + \gamma dis^2(\bar{I}_{in}, \bar{I}_{prior})]dxdy +$$
$$\int_{\Omega_{out}} [w(x, y)dis^2(I(x, y), \bar{I}_{out})]dxdy,$$

wherein $$w(x, y) = \frac{\sum_{k=1}^{K}[I_k(x, y) - I_{base}(x, y)]}{max_{(x,y)}\left|\sum_{k=1}^{K}[I_k(x, y) - I_{base}(x, y)]\right|},$$

$I_k(x, y)$ is the intensity of a pixel $(x, y)$ in a kth slice of the time series, $I_{base}(x, y)$ is a baseline intensity for the pixel $(x, y)$, $I(x, y)=[I_1(x, y), I_2(x, y), \ldots, I_K(x, y)]^T$ is a intensity-time curve for each pixel $(x, y)$, $\bar{I}_{in}$ and $\bar{I}_{out}$ are average intensity-time vectors for region $\Omega_{in}$ and $\Omega_{out}$, respectively, $\Omega_{in}$ and $\Omega_{out}$ are the regions inside and outside boundary $C_1$, respectively, $\bar{I}_{prior}$ is a prior known average intensity-time curve inside boundary $C_1$, $$dis^2(I_1, I_2) = \frac{1}{2} - \frac{\langle \tilde{I}_1, \tilde{I}_2 \rangle}{2\|\tilde{I}_1\|_2\|\tilde{I}_2\|_2}$$
$$= \frac{\|\tilde{I}_1\|_2\|\tilde{I}_2\|_2 - \langle \tilde{I}_1, \tilde{I}_2 \rangle}{2\|\tilde{I}_1\|_2\|\tilde{I}_2\|_2}$$

where $\tilde{I}$ is a mean removed vector, and $\alpha$, $\beta$, and $\gamma$ are positive scalars that lie in [0, 1] and satisfy $\alpha+\beta+\gamma=1$, $$E_{img}(C) =$$
$$\int_{\Omega_{in}} [\alpha(I_r(x, y) - m_{in})^2 + \beta(I_r(x, y) - m_{prior})^2 + \gamma(m_{in} - m_{prior})^2]dxdy +$$

$$\int_{\Omega_{in}} \left(\frac{I_r(x, y) -}{m_{out}}\right)^2 dxdy,$$

wherein $I_r$ is the reference frame, $m_{in}$ and $m_{out}$ are average intensities inside $\Omega_{in}$ and $\Omega_{out}$, respectively and $m_{prior}$ is a priori known average intensity inside curve $C_1$, $E_{int}=\int_{C_1}ds$, an arc length of boundary $C_1$, and $E_{shape}=\int_{C_1}D^2(x, y)ds$, wherein $D(x, y)$ is a distance between a pixel $(x, y)$ in an elliptical prior shape and the estimated boundary $C_1$.

11. The method of claim 10, further comprising weighting each pixel on the endo-cardial boundary according to its distance to a convex hull of endo-cardial boundary, wherein pixels closer to the convex hull have a greater weight.

12. The method of claim 9, wherein the energy functional for the epi-cardium is $E(C_2)=E_{seq}(C_2)+\lambda E_{img}(C_2)+\mu E_{int}(C_2)+\kappa E_{shape}(C_2)+E_{con}(C_2)$,
wherein $C_2$ is the epi-cardial boundary, $\lambda$, $\mu$, and $\kappa$ are parameters that control weights of different terms, wherein $$E_{seq}(C) = \int_{\Omega_{in}} w(x, y)[\alpha dis^2(I(x, y), \bar{I}_{in}) + \beta dis^2(I(x, y), \bar{I}_{prior}) + \gamma dis^2(\bar{I}_{in}, \bar{I}_{prior})]dxdy +$$
$$\int_{\Omega_{out}} [w(x, y)dis^2(I(x, y), \bar{I}_{out})]dxdy,$$

wherein $$w(x, y) = \frac{\sum_{k=1}^{K}[I_k(x, y) - I_{base}(x, y)]}{max_{(x,y)}\left|\sum_{k=1}^{K}[I_k(x, y) - I_{base}(x, y)]\right|},$$

$I_k(x, y)$ is the intensity of a pixel $(x, y)$ in a kth slice of the time series, $I_{base}(x, y)$ is a baseline intensity for the pixel $(x, y)$, $I(x, y)=[I_1(x, y), I_2(x, y), \ldots, I_K(x, y)]^T$ is a intensity-time curve for each pixel $(x, y)$, $\bar{I}_{in}$ and $\bar{I}_{out}$ are average intensity-time vectors for region $\Omega_{in}$ and $\Omega_{out}$, respectively, $\Omega_{in}$ and $\Omega_{out}$ are regions inside and outside boundary $C_2$, respectively, and $\Omega_{in}$ excludes a region inside the endo-cardium boundary $C_1$, $\bar{I}_{prior}$ is a prior known average intensity-time curve inside boundary $C_2$, $$dis^2(I_1, I_2) = \frac{1}{2} - \frac{\langle \tilde{I}_1, \tilde{I}_2 \rangle}{2\|\tilde{I}_1\|_2\|\tilde{I}_2\|_2}$$

$$= \frac{\|\tilde{I}_1\|_2 \|\tilde{I}_2\|_2 - \langle \tilde{I}_1, \tilde{I}_2 \rangle}{2\|\tilde{I}_1\|_2 \|\tilde{I}_2\|_2}$$

where $\tilde{I}$ is a mean removed vector, and $\alpha$, $\beta$, and $\gamma$ are positive scalars that lie in [0, 1] and satisfy $\alpha+\beta+\gamma=1$, $$E_{img}(C) = \int_{\Omega_{in}} [\alpha(I_r(x,y) - m_{in})^2 + \beta(I_r(x,y) - m_{prior})^2 + \gamma(m_{in} - m_{prior})^2] dx\, dy +$$

$$\int_{\Omega_{out}} \left( \frac{I_r(x,y) -}{m_{out}} \right)^2 dx\, dy,$$

wherein $I_r$ is the reference frame, $m_{in}$ and $m_{out}$ are average intensities inside $\Omega_{in}$ and $\Omega_{out}$, respectively and $m_{prior}$ is a priori known average intensity inside curve $C_1$, $E_{int}=\int_{C_2} ds$, an arc length of boundary $C_2$, $E_{shape}=\int_{C_2} D^2(x,y)ds$, wherein $D(x,y)$ is a distance between pixel $(x,y)$ and the estimated boundary $C_2$, and $E_{con}=\int_{C_2} f[d_1(x,y)]ds$, wherein $d_1(x,y)$ is a distance between a point $(x,y)$ on $C_2$ and $C_1$, and $$f[d_1(x,y)] = \begin{cases} 0, & \text{if } d_{min} \leq d_1(x,y) \leq d_{max} \\ \infty, & \text{otherwise} \end{cases},$$

wherein $d_{min}$ and $d_{max}$ are minimum and maximum allowed myocardium thicknesses, respectively.

13. A method of automatically generating a myocardial perfusion map from a sequence of magnetic resonance (MR) volumetric images, said method comprising the steps of:

providing a time series of registered myocardial perfusion MR image slices having reference image with a masked left ventricle (LV);

detecting the right ventricle (RV) in the reference frame and estimating a thickness of the myocardium based on the detected LV and RV;

initializing the endo-cardium and epi-cardium boundaries from the LV mask and myocardial thickness estimate;

segmenting the endo-cardium by minimizing an energy functional;

masking out a left-ventricle (LV) blood pool inside of the endo-cardium from the image series, and segmenting the epi-cardium by minimizing another energy functional, wherein each said energy functional incorporates correlation information among pixels in a same slice as well as temporal correlations across the slices in the time series, prior shape information and anatomical constraints.

14. The method of claim 13, wherein providing a time series of registered myocardial perfusion MR image slices comprises providing a time series of myocardial perfusion MR image slices, determining a region of interest (ROI) in a reference frame selected from said time series, and registering each image slice in said time series of slices to the reference frame to obtain a series of registered ROIs, wherein the series of registered ROIs are used to segment endo- and epi-cardial boundaries of a myocardium in the ROI.

* * * * *